(12) United States Patent
Volkenand et al.

(10) Patent No.: US 10,041,625 B2
(45) Date of Patent: Aug. 7, 2018

(54) SUPPORT SYSTEM COMPRISING A CONTROL UNIT

(75) Inventors: Kai Volkenand, Hünfeld (DE); Fritz Ickler, Kirchheim (DE); Joachim Barton, Fulda (DE); Stefan Perplies, Hünfeld (DE)

(73) Assignee: Ondal Medical Systems GmbH, Hunfeld (GE)

( * ) Notice: Subject to any disclaimer, the term of this patent is extended or adjusted under 35 U.S.C. 154(b) by 0 days.

(21) Appl. No.: 13/824,208

(22) PCT Filed: Nov. 16, 2011

(86) PCT No.: PCT/EP2011/005776
§ 371 (c)(1),
(2), (4) Date: Apr. 26, 2013

(87) PCT Pub. No.: WO2012/065732
PCT Pub. Date: May 24, 2012

(65) Prior Publication Data
US 2013/0221183 A1    Aug. 29, 2013

(30) Foreign Application Priority Data

Nov. 17, 2010   (DE) .................. 10 2010 051 633

(51) Int. Cl.
*A61G 12/00* (2006.01)
*F16M 13/02* (2006.01)
*A61G 13/10* (2006.01)

(52) U.S. Cl.
CPC ......... *F16M 13/027* (2013.01); *A61G 12/004* (2013.01); *A61G 13/107* (2013.01); *F16M 13/022* (2013.01); *A61G 2203/726* (2013.01)

(58) Field of Classification Search
CPC .................. F16M 13/022; F16M 13/027
(Continued)

(56) References Cited

U.S. PATENT DOCUMENTS 7,770,860 B1    8/2010  Culpepper et al.
2005/0166413 A1*  8/2005  Crampton .................. 33/503
(Continued)

FOREIGN PATENT DOCUMENTS

DE    36 42 956 A1   6/1988
DE    39 16 975 A1   11/1990
(Continued)

*Primary Examiner* — Bradley Duckworth
(74) *Attorney, Agent, or Firm* — Seed IP Law Group LLP

(57) ABSTRACT

A carry system or a medical ceiling support for carrying or supporting medical-technical devices in a hospital treatment room. The ceiling support is provided with at least one extension or arm arranged substantially horizontally and at least one supporting column; at least one pivot joint and/or at least one lifting and lowering device; a support head mounted at the extension or arm for reception of the medical-technical devices; and an operating aid with at least one operating element for releasing or operating a respective brake in the at least one pivot joint or for operating the at least one lifting and lowering device. The ceiling support is arranged for generation of a feedback or back coupling which identifies or characterizes the respective brake or lifting and lowering device operated by the operating aid for a user locally at the support.

13 Claims, 2 Drawing Sheets

(58) Field of Classification Search
USPC ...... 248/550, 276.1, 288.11, 123.2; 359/384; 606/1, 130
See application file for complete search history.

(56) References Cited

U.S. PATENT DOCUMENTS

2007/0142824 A1* 6/2007 Devengenzo ...... A61B 19/2203 606/1
2007/0156122 A1* 7/2007 Cooper ............................ 606/1

FOREIGN PATENT DOCUMENTS

| DE | 197 51 871 A1 | 6/1999 |
| DE | 10 2004 008 381 A1 | 1/2005 |
| DE | 296 24 639 U1 | 7/2006 |
| DE | 10 2009 009 549 A1 | 9/2010 |

* cited by examiner

SUPPORT SYSTEM COMPRISING A CONTROL UNIT

BACKGROUND OF THE INVENTION

The present invention refers to a carry system for carrying or supporting medical-technical devices in a treatment room, as for example in a medical practice, in an operating theatre or an intensive care unit.

The invention particularly refers to a carry system comprising a support (for example a ceiling support) and at least one joint or a mechanism, by which the support can be moved in the treatment room. Hereby, the invention also refers to a ceiling support or an extension system for the suspension of medical devices.

Carry systems for medical-electrical end devices are often used in the clinical field, particularly in hospitals (for example, in operating theatres and intensive care units) and in medical practices. Medical ceiling supports are known serving for suspended reception of medical devices, as for example supply consoles, monitoring screens, ventilator systems, infusion pumps, and they are used in operating theatres or intensive care units for the placing and medical-technical supply of the systems which are required for operations, intensive care and examination of the patient respectively.

Typically, such ceiling supports are comprised of at least one vertical column or of a horizontal pivotable arm or extension with vertical column, which is pivotably fixed at the ceiling by means of a rotary joint, and of a console or a carrier, also called support head, in or on which the required connections and devices are arranged. By means of the pivotably supported arm or extension the support head can be swiveled in a desired radius, whereby the access to the patient is facilitated or an ergonomic working position can be set up. The support head can be provided with a handle, which serves for swiveling the support head in a desired position.

In order that the support head rests in its desired end position after the swiveling, typically a brake (for example a locking brake) is provided at the pivot joint or pivot bearing of the arm or extension respectively. This brake can be provided as friction brake, wherein the operating force can be excessive. However, at least one locking brake can be provided in controllable form, which blocks the rotary joint in its resting position. The controllable locking brakes also facilitate the specific motion of the support head, as the lockings of the rotary joints can be released individually. If the locking brake is released, the support head can be swiveled manually. For this purpose, an operating aid can be provided in the handle, for example in the form of an operating element or a switcher.

Further, the arm or the extension can be adjustable in height. In other words, additionally or alternatively to its swivel mechanism, it can be adjusted in its height position by adjusting the arm via a corresponding mechanism, for example by a motor. Also the lifting actuator can be operated by an operating aid, as for example an operating element or a switcher respectively. The operating element can be provided in a handle.

Once the ceiling support system or carry system of the above-mentioned style is provided with several operating elements or switchers, there is the danger of confusion or uncertainty in view of which joint or which mechanism is operated by which operating element or switcher. In more complex ceiling support systems, which are composed of several horizontal arms or extensions and a height-adjustable vertical column, for each brake and also for the motor for height adjustment of the column there are provided operating elements at the support head at the pivot joints between the arms and the arm and the column. Therefore it may be difficult for the staff to find the respective operating element on an operating aid with a plurality of operating elements, which activates the desired motion or releases the brake required therefor.

This problem increases considerably when the user has to operate the carry system or support head during weak or bad lighting conditions, which happens quite often in practice. Although patients in an intensive care unit normally sleep in a darkened room during the night, of course the doctors and nurses continue with their work. This also includes modifications of the settings of the medical devices or carry systems. During an operation, for specific procedures (i.e. during endoscopic procedures) the lights in the treatment room are often damped or "dimmed" in order to optimally reveal the diagnostic radiations and/or the diagnostic pictures, but the medical staff still has to cope with such slightly darkened lighting conditions. Also during an emergency lighting in the hospital, the lighting conditions are of course not optimal. Therefore, a correct handling of such a carry system encounters difficulties.

BRIEF DESCRIPTION OF THE INVENTION

It is an object of the invention to provide a carry system or a ceiling support for carrying or supporting medical-technical devices which improves the handling for the user or for the operating staff.

This object is solved by a carry system according to claim 1 and a ceiling support according to claim 11. Preferred embodiments of the invention arise from the features of the dependent claims.

According to one aspect, the invention provides a carry system for carrying or supporting medical-technical devices in a treatment room, wherein the carry system comprises the following features:

- a support, for example a ceiling support, for mounting in the treatment room,
- at least one joint and/or at least one mechanism, by which the support can be moved in the treatment room,
- an operating aid for operating at least a part of the carry system in order to control the motion of the support, and
- means for generation of a feedback or back coupling which indentifies or characterizes for a user the part of the carry system which is to be operated by the operating aid.

The means for generating a feedback or back coupling can be conceived as a feedback system and serves for informing the user or the operating staff about the correlating part of the carry system and its operation with the operating aid. In this context, the feedback system can locally identify or characterize the operated or to be operated part of the carry system in the system. The feedback system generates a signal or an active feedback such that the user receives information about the part to be operated by the operating aid and can ascertain that he is just operating the correct part of the carry system.

In a preferred embodiment of the invention, the at least one part of the carry system which is to be operated by the operating aid, is connected with the at least one joint or mechanism. Preferably, the at least one part of the carry system, which is to be operated by the operating aid, comprises a brake such that the motion of the support is controllable with the operating aid by releasing or applying the brake. For this purpose, the operating aid typically comprises one or several operating elements. As the brake is integrated within the joint or bearing, a user cannot perceive at all if it is i.e. actually released or not by the operating aid. By the present invention, however, the user is immediately informed about the brake, which is actually operated or released by the operating aid, by means of the feedback.

In a preferred embodiment of the invention, each brake is controlled pneumatically or electrically. A pneumatic brake can either be designed as active brake, which only functions during application of compressed air, or as static brake, which fulfills its braking function in its rest position and which is released by means of compressed air. Particularly preferably in the context of the present invention, however, magnetically controllable brakes are used. The electromagnetic brakes can be designed as friction brakes or as form-fit-brakes, which block an onward motion by establishing a tight fit. Inter alia, electromagnetic brakes provide the advantage that they can be deployed without any problems in areas in which no compressed air is available. Regardless of the type of brake which is used, the operation of the brake by the operating aid can be effected by switching an operating element. If an operating element is operated, the brake is released such that the support or the support head can be swiveled. Once positioned in the desired end position the brake is locked again.

As described above, the carry system can of course also be adjustable in height, such that additionally or alternatively to the at least one brake in the pivot joint, the carry system is provided with at least one height adjusting mechanism (also called lifting and lowering device) which can be adjusted for example by motor. Therefore, the at least one part of the carry system, which is to be operated by the operating aid, can comprise an electric motor, such that the height adjustable motion of the support is controllable through the operating aid by activation or deactivation of the electric motor.

In a preferred embodiment of the invention, the carry system is provided with several joints or several mechanisms, by which the support can be moved in the treatment room. Therefore, the operating aid is adapted or configured for operating several parts of the carry system for controlling the motion of the part. For this purpose, the operating aid is provided with several operating elements or switchers in order to operate each of the several parts of the carry system by individually switching a respective operating element. Therefore, preferably, the means for generation of a feedback or the feedback system is arranged for generating an individual feedback for each part of the carry system during its operation by the operating aid.

In a preferred embodiment of the invention, the feedback or the back coupling is a sense-perceptive feedback or back coupling, which is perceivable or can be perceived by the user or the operating staff by at least one of his sensory perceptions.

In a particularly preferred embodiment of the invention, the sense-perceptive feedback comprises an optical signal, which is preferably generated by light. For example, the optical signal could consist of a light which shines. In addition, the optical signal which is preferably generated by light, could be characterizing numerically (for example quantity of lights), in terms of colour or by blinking (type of blinking). Therefore, preferably, the feedback system or the means for generating a feedback is provided with at least one luminous element which locally identifies or characterizes the part of the carry system or the corresponding joint or the corresponding mechanism at the support, typically by illumination. In such a way, the user (that is to say the operating staff) can also in very bad lighting conditions clearly discern and perceive which part of the carry system is actually operated by the operating aid. This is shown to him by an active optical back coupling. The at least one luminous element is preferably arranged in or at an outer paneling of the corresponding joint or mechanism, preferably with a transparent covering or cover panel respectively. Also several luminous elements can be mounted at a position or in connection with a single part of the carry system. Each luminous element is typically controlled electrically and is preferably composed of one or several lighting elements, as for example one or several light-emitting diodes (LED), although other types of luminous elements which are controllable are also included herein.

In a further embodiment of this invention, the feedback can also be an acoustic signal. The acoustic signal could be provided for example in the form of a predefined sound or even a spoken word. In any case, once again it serves for informing the user or the operating staff about which part of the carry system is actually operated by the operating aid.

In a preferred embodiment of the invention, the carry system is provided with a control unit which is adjusted such that it delays or prevents for the moment a switching of the respective part of the carry system during an operation of one of the respective operating elements or switchers of the operating aid until the feedback or back coupling will have been generated for the user. This delay or prohibition could be, for example, a time delay of several (2 or 3) seconds within which the feedback is transmitted to the user. Otherwise this retardation or prohibition could only be overcome by an additional (for example second) operation of the respective operating element or switcher. In such a way, the user has time for perceiving and understanding the feedback of the feedback system, before the part of the carry system which is to be operated by the operating aid will be effectively operated. In case the user has chosen the wrong switcher or the wrong operating element, he has the time to recognize his mistake and correct it before the wrong part of the carry system will be operated. Preferably, the control unit is integrated in the operating aid. In this context, the operating aid can be integrated in or arranged at the support itself by means of its operating elements or switchers. Alternatively or additionally, the operating aid can be configured as remote control.

According to a further aspect, the invention provides a medical ceiling support for carrying or for supporting medical-technical devices in a treatment room, comprising
 at least one extension or arm arranged substantially horizontally and at least one supporting column;
 at least one pivot joint and/or at least one lifting and lowering device;
 a support head mounted at the extension or arm for reception of the medical-technical devices, and
 an operating aid with at least one operating element for releasing or operating a respective brake in the at least one pivot joint and/or for operating the at least one lifting and lowering device,
 means for generating an active feedback, which identifies or characterizes the respective brake or lifting and lowering device correlating with the operating element for a user during operation.

In a preferred embodiment of the invention, each active feedback is a sense-perceptive feedback which is particularly preferably generated as optical signal, preferably by means of a light source. As already mentioned above, the optical signal can also be characterizing in terms of colour, by blinking or numerically. Therefore, the means for generating an active feedback comprises at least one and preferably several luminous elements, which can identify or characterize the corresponding brake and/or the corresponding lifting and lowering device, typically by illumination. The at least one luminous element is preferably arranged locally at the respective part of the support and is, for example, arranged in or at an outer paneling of the corresponding joint or the corresponding lifting and lowering device. Preferably, each pivot joint and each lifting and lowering device is individually indentified or characterized by the sense-perceptive feedback during a respective operation with the operating aid.

In a preferred embodiment of the invention, the sense-perceptive feedback comprises an acoustic signal, preferably by means of a predefined sound, further preferably by means of spoken words.

BRIEF DESCRIPTION OF THE DRAWINGS

Further preferred configurations of the invention arise from the following description of exemplary embodiments, which is made by reference to the enclosed figures, wherein elements which are functionally identical or similar are characterized by the same reference signs.

DESCRIPTION OF THE EMBODIMENTS OF THE INVENTION

Figure 1:
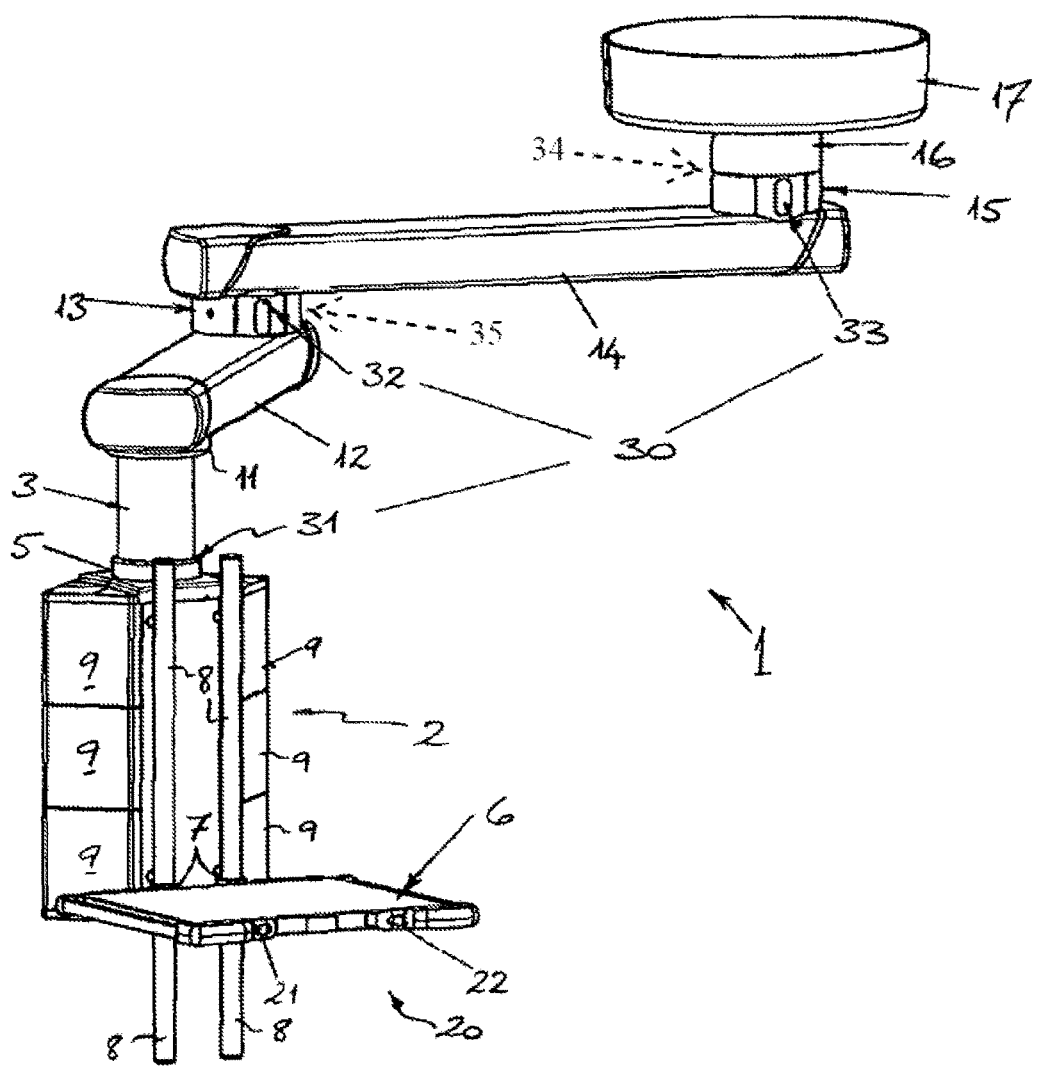
FIG. 1 shows a perspective view of a carry system in the form of a medical ceiling support according to one embodiment of the invention.

FIG. 1 shows a perspective overview of one embodiment of the ceiling support 1 according to the invention in a treatment room (for example in an operating theatre or in an intensive care unit) of a hospital. This ceiling support 1 comprises a support head 2, which is fixed at a vertical column 3. The support head 2 is provided in the form of a console for receiving and supplying medical-technical or medical-electrical (ME) end devices (not shown). In this context, the support head or the console 2 comprises a supporting frame 4, which is mounted at the column 3 over a corresponding reception point or central aperture 5 at an upper side of the supporting frame 4. The support head or the console 2 comprises at least one tray 6 for reception of the ME-devices, wherein the tray 6 is height-adjustably mounted at two tubes extending vertically by means of two clamping jaws 7. Additionally, the console 2 is provided with laterally arranged modular units 9, which include inter alia sockets or plug connections (not shown) for medical-technical supply or for removal of gases and/or electrical supply currents as well as for creation of electronic communication paths for the ME-end devices.

Figure 2:
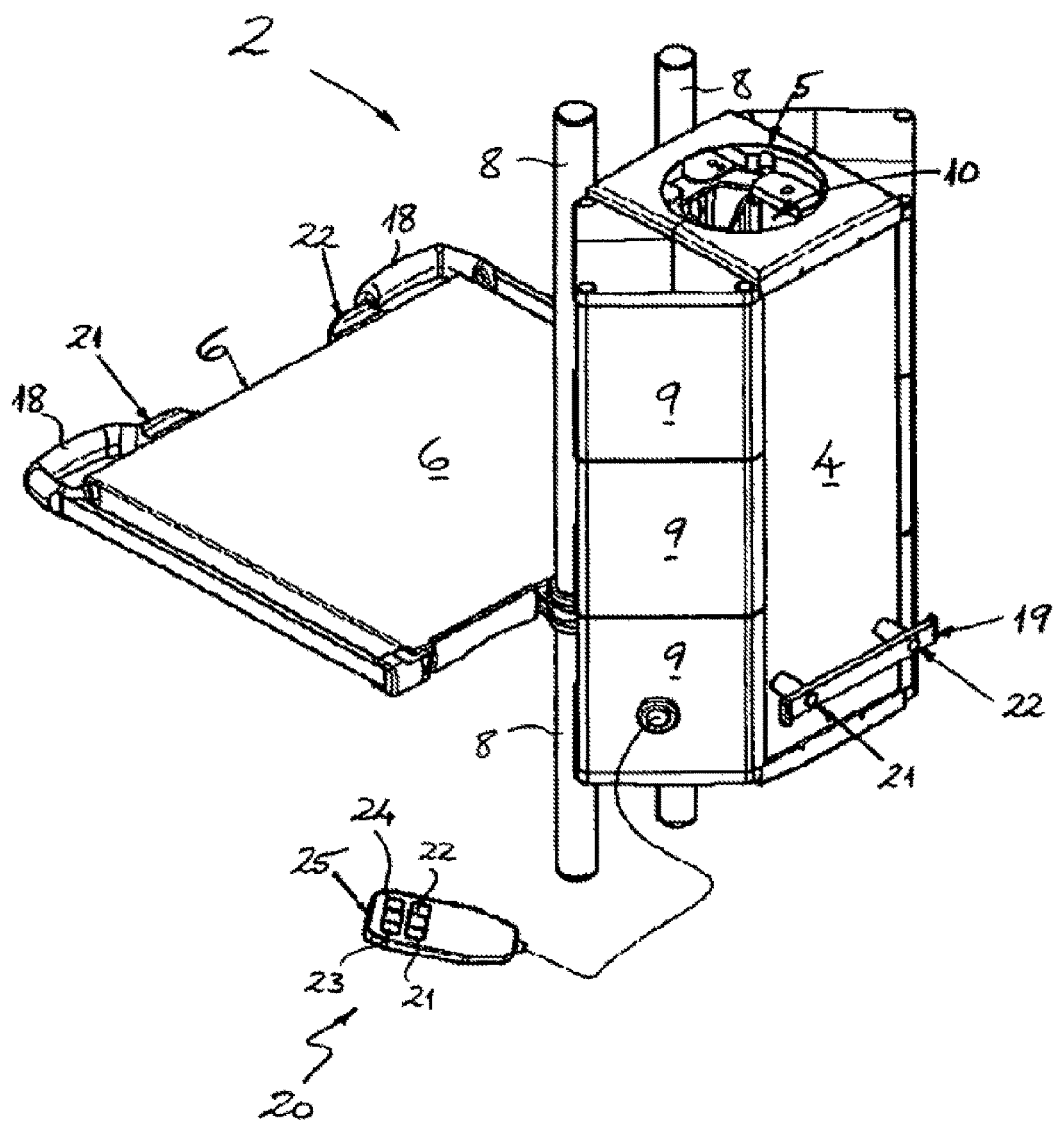
FIG. 2 shows a perspective view of the support head or the console of the inventive carry system of FIG. 1.

By also referring to FIG. 2 now, the support head 2 is connected with the column 3 by means of a lifting and lowering device 10 provided in the supporting frame 4 of the console, with which a vertical height adjustment of the support head 2 is controllable by a motor. The lifting and lowering device 10 is arranged within the supporting frame 4 and is covered with paneling elements, such that it cannot be seen from the outside. The column 3 in turn is pivotably fixed by means of a rotary joint 11 at a horizontal lower swiveling arm 12. The lower arm 12 is pivotably connected with a further horizontal upper swiveling arm 14 by means of a lower pivot bearing or pivot joint 13, and the arm 14 is mounted by means of an upper pivot bearing or pivot joint 15 and a short vertical column part 16 at a ceiling by means of a ceiling reception 17. The lower and the upper pivot bearing or pivot joint 13, 15 are each provided with a brake 34, 35, which may be an electromagnetic locking brake or friction brake respectively, which, however, is not visible, as the respective rotary joints or locking brakes are integrated in the joint and are covered with paneling elements.

On the front side and/or the back side of the support head or the console 2 there are provided two handles 18, 19, with which the user or the operating staff can manually move and position the console 2. Additionally, the support head 2 comprises an operating aid 20 with operating elements or switchers 21-22 in the form of buttons for operation of the electromagnetic brake of the pivot bearing or pivot joints 13, 15, whereby by operating one of the operating elements or switchers 21, 22 a corresponding electromagnetic brake is released, which enables the user to swivel the arm 12, 14. Likewise, the operating aid 20 comprises a remote control 25, which is provided with corresponding operating elements or switchers 21, 22 for the brakes as well as operating elements or switchers 23, 24 ("Up" & "Down") in the form of buttons for the vertical height adjustment of the support head 2 by means of the lifting and lowering device 10.

In practice, the operating staff grabs one of the handles 18, 19 of the support head 2—for example with both hands—and presses with the thumb of the left or the right hand the desired button of the respective operating elements 21, 22. Thereby, the corresponding electromagnetic locking brake in the respective pivot bearing or pivot joint 13, 15 is released and the pivot bearing or pivot joint is freely pivotable, such that the operating staff can push or pull the support head 2 into the desired position. Subsequently, the operating staff releases the button again such that the locking brake is locked again. The support head 2 is then fixed in its new position. In a similar way, this functions with the remote control 25, but with this the user pushes or pulls the support head 2 only with one hand, as he typically holds the remote control with the other hand. In this example, by means of the remote control 25, he also has a bigger choice of possible motions and therefore also of operating elements or switchers 21-24.

According to the invention, during the operation of one of the operating elements or switchers 21-24 of the operating aid 20 a signal or an active feedback is generated, which identifies or characterizes the correlating brake or lifting and lowering device, which is to be operated with the operating element, for a user during operation. In this embodiment, the ceiling support 1 is provided with means 30 for generating an optical signal, wherein the means 30 are provided in the form of flashing indicators 31-33 locally at the support 1 at the respective positions or joints 13, 15. Each indicator 31-33 is provided with a luminous element (for example with one or several light-emitting diodes), which is integrated in the paneling of the support and which is preferably provided with a translucent or transparent covering. If the operating element 22 is operated (pressed) by the user for releasing the locking brake in the upper pivot bearing/pivot joint 15, the indicator 33 is illuminated by the feedback system at the upper pivot bearing/pivot joint 15 in order to indicate to the user that the brake in this bearing 15 has been released at this very moment. If the operating element 21 is operated (pressed) by the user for releasing the locking brake in the lower pivot bearing/pivot joint 13, the indicator 32 at the lower pivot bearing/pivot joint 13 is illuminated, in order to indicate to the user that the brake in this bearing 13 has been released at this very moment. Thereby a signal with active back coupling is generated and sent to the operating staff such that the staff can make sure that the desired part of the ceiling support 1 is operated by the operating aid 20. Should the wrong indicator 31-33 give light, the staff can release the pressed button 21-24 and press another one.

After completing positioning and inactivity of the operating elements 21-24, the medical ceiling support 1 remains fixed in the desired end position by means of the locking brakes. Further, the swiveling can be supported by motor, pneumatically or by further methods. In order to facilitate the motional functioning of the operating elements 21-24 of the respective pivot/bearing positions of the medical ceiling support 1, in addition to the present indicators 31-33 an optical light source can be provided at the bearing/pivot positions 13, 15 or at the adjoining components.

The invention is based on a development of a medical ceiling support, which is braked purely electromagnetically by means of an integrated power supply at the present bearing or pivot positions, and which shows the operator/user an optical back coupling (signal) of the released brake of the bearing/pivot position by means of indicators during release of the electromagnetic brake. Up to the point in time of the invention, no medical ceiling supports with electromagnetic bearing or pivot positions and integrated power supply have been known to the inventors, which feature an optical back coupling (signal) during operation of the brake switchers. One of the advantages of the invention is that during bad lighting conditions (for example during the night in an intensive care unit or during emergency lighting) a definite correlation of the operating aid or operating elements can still be ensured. At the same time, the medical ceiling support according to the invention is provided with an integrated power supply with electromagnetic brakes for controlling each of the bearing/pivot positions.

The invention claimed is:

1. A carry system for carrying or supporting a medical-technical device in a treatment room, the carry system comprising:
    a support for mounting in the treatment room;
    at least one joint or at least one mechanism, by which the support can be moved in the treatment room, an upper arm pivotably coupled to a lower arm via the at least one joint, the at least one joint including an electromagnetic locking brake that is integrated in the at least one joint and covered with an outer paneling, the outer paneling positioned between the upper arm and the lower arm;
    an operating aid for operating the at least one joint or mechanism, in order to control a motion of the support; and
    a feedback system including at least one luminous element which, in response to release of the at least one joint or at least one mechanism, identifies or characterizes the corresponding joint or mechanism locally at the support at a respective position of the mechanism or at the corresponding joint operated by the operating aid, the at least one luminous element integrated in the outer paneling of the respective at least one joint or the at least one mechanism to form an integral luminous panel, the outer paneling of the respective at least one joint or the at least one mechanism being exposed to an exterior of the carry system, the integral luminous panel of the at least one joint comprising a pivot joint which is pivotably moveable relative to an adjacent structure, and the integral luminous panel of the at least one mechanism being slideably moveable relative to an adjacent structure.

2. A carry system according to claim 1, wherein the at least one joint or at least one mechanism is to be operated by the operating aid, such that the motion of the support is controllable with the operating aid by releasing the electromagnetic locking brake.

3. A carry system according to claim 1, wherein the at least one joint or at least one mechanism, which is to be operated by the operating aid, comprises an electric motor, such that the motion of the support is controllable with the operating aid by activation or deactivation of the electric motor.

4. A carry system according to claim 1, wherein the at least one luminous element is characterizing in terms of color, blinking or numerically.

5. A carry system according to claim 1, wherein the carry system is provided with several joints or several mechanisms, by which the support can be moved in the treatment room, and wherein the operating aid for operation of several joints or several mechanisms is adapted or configured for controlling a motion of the support;
    wherein the at least one luminous element is arranged for generation of an individual sense-perceptive feedback for each correlating joint or mechanism during an operation with the operating aid.

6. A carry system of claim 1 wherein the support is a ceiling support.

7. A carry system of claim 1 wherein the at least one luminous element identifies or characterizes the corresponding joint or the corresponding mechanism by illumination.

8. A medical ceiling support for carrying or for supporting a medical-technical device in a treatment room, the ceiling support comprising:
    an extension or arm, arranged substantially horizontally, and at least one supporting column;
    at least one pivot joint and/or at least one lifting and lowering device;
    a support head mounted at the extension or arm for reception of the medical-technical device;
    an upper arm pivotably coupled to the extension or arm via the at least one pivot joint, the at least one pivot joint including an electromagnetic locking brake that is integrated in the at least one pivot joint and covered with an outer paneling, the outer paneling positioned between the upper arm and the lower arm;
    an operating aid with at least one operating element for releasing or operating a respective electromagnetic locking brake in the at least one pivot joint and/or for operating the at least one lifting and lowering device;
    a feedback system which, in response to releasing or operating of the at least one pivot joint or at least one lifting and lowering device, generates a signal or a feedback of an operation of the respective electromagnetic locking brake or lifting and lowering device of the ceiling support by the operating aid, the feedback system including at least one luminous element integrated in the outer paneling of the at the at least one pivot joint which is pivotably moveable relative to an adjacent structure or in the outer paneling of the at least one lifting and lowering device that is slideably moveable relative to an adjacent structure to form an integrated luminous panel, the outer paneling being exposed to an exterior of the medical ceiling support; and wherein the ceiling support is arranged for generation of the signal or the feedback which identifies or characterizes the respective brake or lifting and lowering device operated by the operating aid for a user locally at the ceiling support.

9. A ceiling support according to claim 8, wherein the signal or the feedback comprises an optical signal by means of a light source, wherein optionally the optical signal can be characterizing in terms of color, blinking or numerically.

10. A ceiling support according to claim 8, wherein the ceiling support is provided with the at least one luminous element which identifies or characterizes the corresponding electromagnetic locking brake or the corresponding lifting and lowering device, by illumination.

11. A ceiling support according to claim 8, wherein the signal or the feedback comprises an acoustic signal by means of a predefined sound, which comprises spoken words.

12. A ceiling support according to claim 11, wherein the signal or the feedback individually identifies or characterizes each pivot joint and each lifting and lowering device during a respective operation by the operating aid.

13. A ceiling support according to claim 8, wherein each pivot joint is provided with an integrated power supply with the electromagnetic locking brake for controlling the pivot joint.

* * * * *

UNITED STATES PATENT AND TRADEMARK OFFICE
CERTIFICATE OF CORRECTION

PATENT NO. : 10,041,625 B2
APPLICATION NO. : 13/824208
DATED : August 7, 2018
INVENTOR(S) : Kai Volkenand et al.

Page 1 of 1

It is certified that error appears in the above-identified patent and that said Letters Patent is hereby corrected as shown below:

In the Claims

Column 9, Line 19:
"according to claim 11" should read, --according to claim 8--.

Signed and Sealed this
Thirty-first Day of December, 2019

Andrei Iancu
*Director of the United States Patent and Trademark Office*